C. H. CABLE & E. W. JONES.
BATTERY GRID.
APPLICATION FILED JUNE 25, 1917.
1,267,846.
Patented May 28, 1918.
2 SHEETS—SHEET 1.
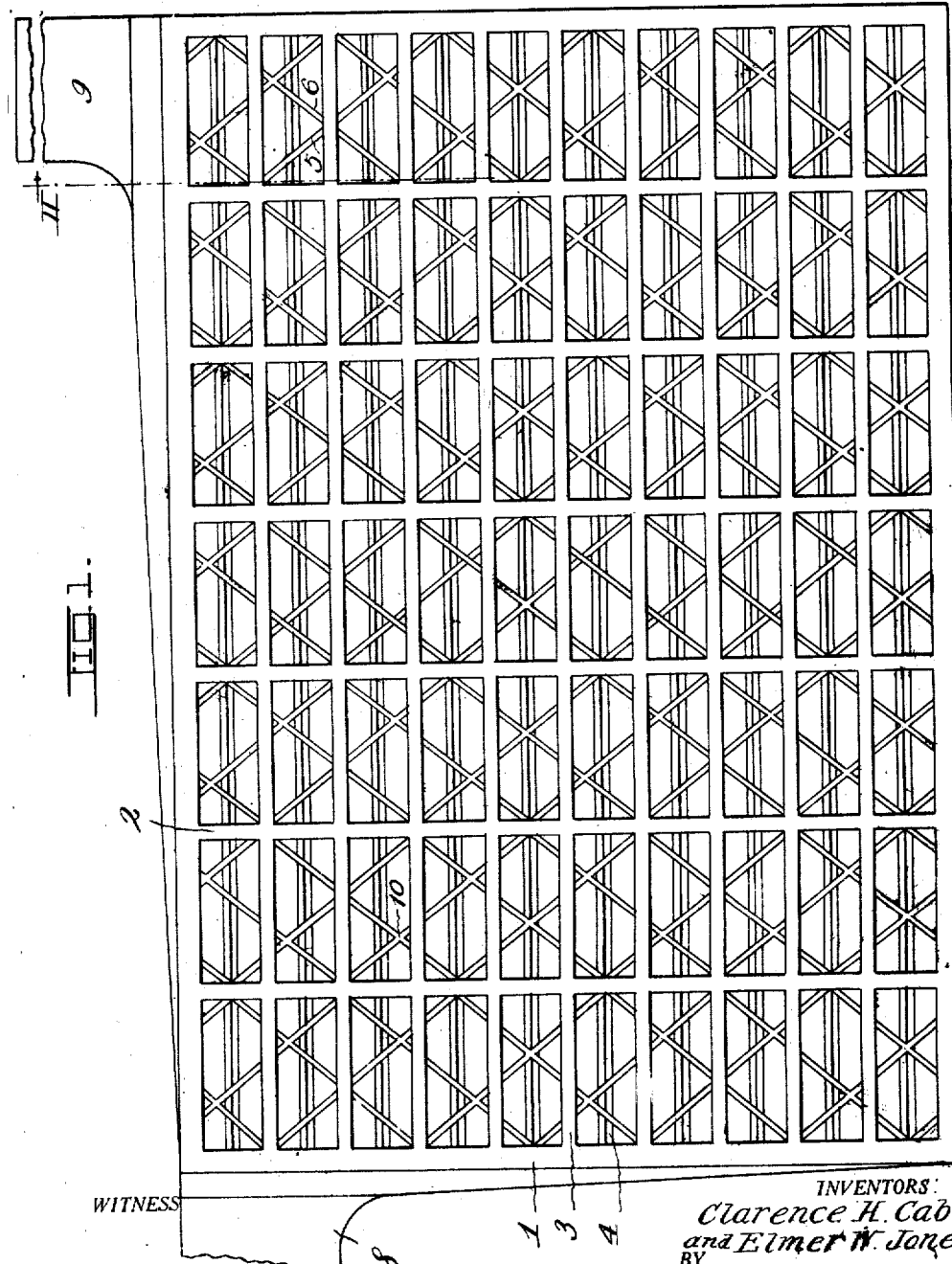
WITNESS
Fred C. Fischer
INVENTORS
Clarence H. Cable
and Elmer W. Jones,
BY
F. G. Fischer,
ATTORNEY.

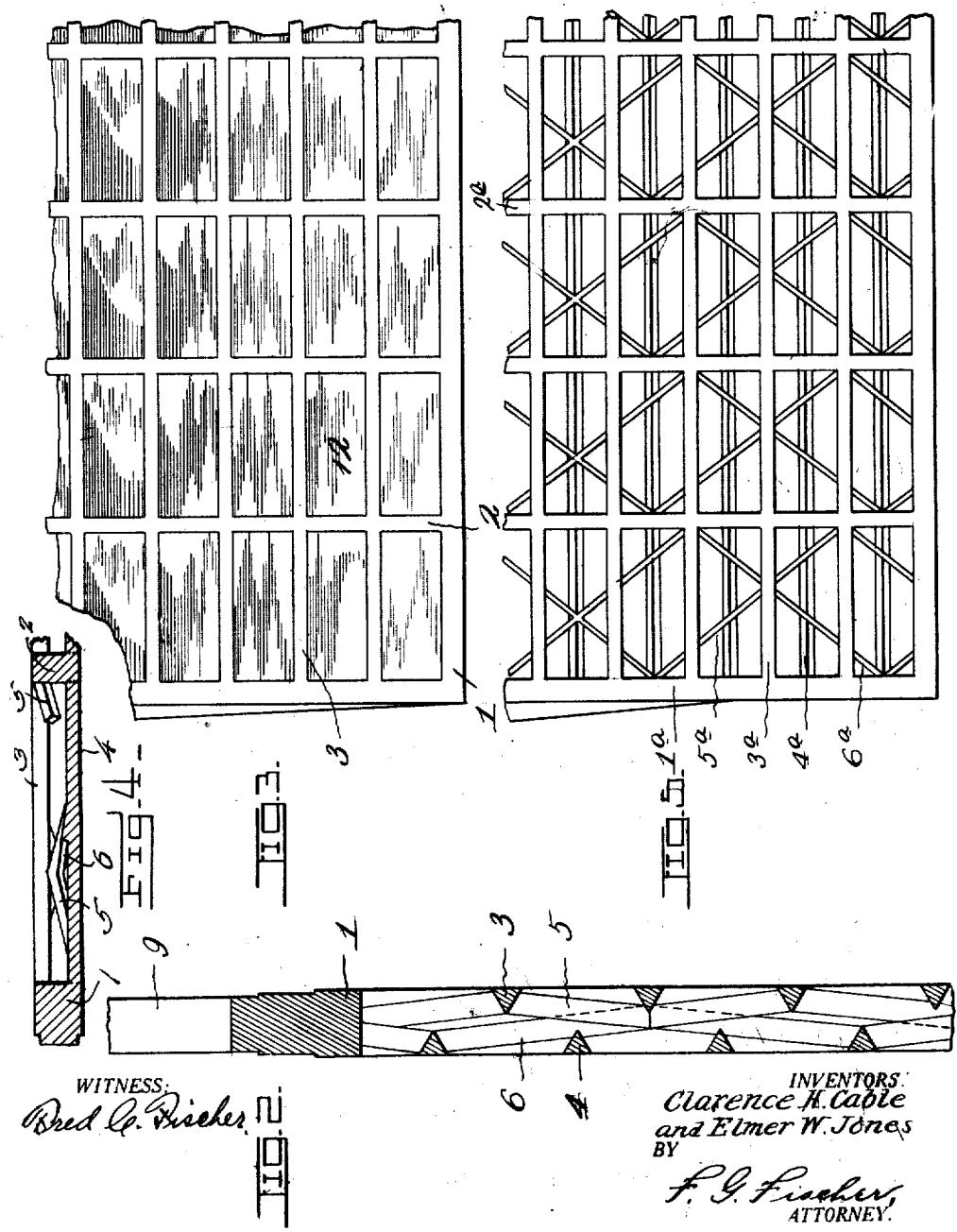

UNITED STATES PATENT OFFICE.

CLARENCE H. CABLE, OF TOPEKA, KANSAS, AND ELMER W. JONES, OF KANSAS CITY, MISSOURI.

BATTERY-GRID.

1,267,846.  Specification of Letters Patent.  Patented May 28, 1918.

Application filed June 25, 1917. Serial No. 176,748.

*To all whom it may concern:*

Be it known that we, CLARENCE H. CABLE, a citizen of the United States, residing at Topeka, in the county of Shawnee and State of Kansas, and ELMER W. JONES, a citizen of the United States, residing at Kansas City, in the county of Jackson and State of Missouri, have invented certain new and useful Improvements in Battery-Grids, of which the following is a specification.

Our invention relates to improvements in grids for secondary or storage batteries, and one object is the provision of a grid or support for the active material, of such strength and construction as to withstand the excessive vibration to which batteries are subjected when in use on automobiles.

A further object is to maintain low internal resistance and high conductivity after long continued service and in all conditions of electric charge. With long use the active materials of a storage battery plate tend to waste or fall away from the surface supports, which, in the ordinary type of grid construction, leaves the interior portion in poor electrical contact with the conducting frame work. Also when a battery is discharging the active material shrinks or contracts, pulling away from the frame work and resulting in poor electrical contact and consequent high internal resistance, all of which we seek to overcome in our present grid.

Another object of our invention is the provision of an adequate support for the active material, such for instance, as lead oxid paste, which has been molded into the grid. This object is attained by so disposing the supporting members of the grid, as to bind and hold the active material in place and prevent its falling away, said supporting members, also, being disposed so as to reinforce the grid against buckling and cracking which loosen the oxid, and we thereby provide a grid combining in a high degree the elements of light weight, long life, and efficiency of service.

In connection with the above, is the requirement that the electrical resistance shall be relatively low, so that heating effects during discharge are largely eliminated, yet maintaining the maximum amount of metal in the body of the grid, to secure the highest efficiency within the cell. In view of the foregoing requirements, our experiments have been conducted in an endeavor to obtain the proper design of the metal frame of the grid, which for commercial reasons, must be kept within certain requirements, as to size and weight. This latter consideration is one of importance in view of the extensive use of storage batteries on automobiles.

In carrying out the invention we attain the objects sought by providing a grid embodying vertical partition members, horizontal grating members intersecting said partition members, a series of diagonal members running obliquely through and across the grid in such manner as to strengthen and support the same against the forces that tend to buckle, warp and break it, and a rectangular frame surrounding all of the foregoing elements.

The diagonal members intersect the vertical and horizontal members and each other at various points, as shown in the accompanying drawings, and tie the whole structure together in truss formation capable of resisting strains in all directions to which the grid is subjected in the course of manufacture and while in active service. Said diagonal members also perform the additional functions of furnishing increased surface and support for the active material, and serve as conductors affording, approximately, the shortest paths for the current from distant points of the grid to the terminal.

A battery plate built upon our grid will, in our judgment, withstand shock and vibration, heavy discharge, high temperature, and extreme sulfation, better than the types of which we are now aware. Such battery plate will also, through freedom from twisting, cracking, and curling at the corners, eliminate short circuits in the battery jar or cell due to punctured separators, and obviate the internal pressure that fractures rubber jars, with consequent loss of electrolyte and damage to the battery.

In the further description of our invention which follows, reference is made to the accompanying drawings, forming a part hereof, and in which:

Figure 1 is a side elevation of a grid constructed in accordance with our invention, as it comes from the mold before the oxid is placed therein.

Fig. 2 is an enlarged, broken sectional view on the line II of Fig. 1.

Fig. 3 is a fragmentary view of the grid after it has been filled with the active material.

Fig. 4 is a fragmentary horizontal section of the grid on line IV of Fig. 1.

Fig. 5 is a fragmentary, modified form of the grid.

Referring now in detail to the various parts, 1 designates the rectangular inclosing frame of the grid; 2 the vertical partition members of, approximately, one-half the cross sectional area of the members of the frame 1; 3 and 4 the horizontal grating members; and 5 and 6 the diagonal members which run obliquely across the grid from one face thereof to the other.

As disclosed more clearly by Figs. 1 and 2, the grid consists of a unitary casting, including each member thereof, and terminals 8 and 9 integral with the frame 1. The diagonal members 5 and 6 are, preferably, of smaller cross-sectional area than the vertical members 2 and the horizontal members 3 and 4, and are substantially rectangular in cross section.

The vertical partition members 2 are also, approximately, rectangular in cross section, while the horizontal grating members 3 and 4, are of triangular cross sectional configuration, converging either inwardly or outwardly, but preferably, inwardly as disclosed by Fig. 2.

Considering now the grid as a whole, it will be seen on reference to Fig. 2, that the horizontal members 3 are arranged adjacent to one face of the frame 1, while the horizontal members 4 are arranged adjacent to the opposite face of said frame. The diagonal members 5 extend obliquely in one direction across the grid from one face thereof to the other and intersect the members 3 and 4 at various points, while the diagonal members 6, extend in an opposite direction obliquely across said grid from one face thereof to the other and intersect the members 3, 4 and 5, at various points, thus reliably bracing the grid against lateral as well as other stresses.

The diagonal members 5 and 6 reinforce each other at their points of intersection 10 and tie the whole structure together in a truss formation capable of resisting strains in all directions. Said diagonal members also provide increased surface and support for the active material 12, and constitute conductors in the interior of the grid to which the oxid adheres after the surface has wasted away from long use and upon which said oxid firmly contracts as the battery discharges.

The finished battery plate may be cut along any vertical or horizontal member cast therein, without sacrifice of strength and rigidity, and by the use of several connecting terminals cast integral with the grid at proper points, plates of any standard size or shape may be cut from a single stock pattern, eliminating the trouble and expense incident to a complete supply of the numerous types of plates in common use. This feature simplifies the problems of manufacture, reduces the stock and selling expense of the distributer, and enables the repairman to make immediate renewals without ordering special parts.

In the modified form disclosed by Fig. 5, $1^a$ designates the rectangular frame of the grid, $2^a$ the vertical members, $3^a$ and $4^a$ the horizontal grating members, and $5^a$ and $6^a$ the diagonal members. This form is similar to the preferred form disclosed by Figs. 1 to 4, inclusive, excepting that each series of diagonal members $5^a$ are in more staggered relation to each other, instead of being, approximately, in alinement as in the preferred form. The foregoing also applies to the diagonal members $6^a$.

It is not desired to limit the exact construction of this battery grid to the precise details as described above, as sundry alterations may be made without varying from the essential features as outlined in the appended claims.

Having thus described our invention, what we claim and desire to secure by Letters Patent, is:

1. In a grid for a secondary battery, a rectangular frame, diagonal members extending obliquely across said frame from one face to the other, and other diagonal members extending obliquely across the frame from one face to the other in a direction opposite to the first-mentioned diagonal members, all of said diagonal members being cast integral with each other at their points of intersection and integral with the rectangular frame where they join the same.

2. In a grid for a secondary battery, a rectangular frame, vertical members extending through said frame and cast integral therewith, diagonal members extending obliquely across said frame from one face to the other, and other diagonal members extending obliquely across the frame from one face to the other in a direction opposite to the first-mentioned diagonal members, all of said diagonal members being cast integral with each other at their points of intersection and integral with the rectangular frame and the vertical members where they join the same, substantially as shown and described.

3. In a grid for a secondary battery, a rectangular frame, horizontal members extending though said frame and cast integral therewith, diagonal members extending obliquely across said frame from one face to the other, and other diagonal members extending obliquely across the frame from one face to the other in an opposite direction to the first-mentioned diagonal members, all of said diagonal members being cast integral with each other at their points of intersection, and integral with the rectangular frame and the horizontal members where they join the same.

4. A grid for a secondary battery, consisting of a rectangular frame having an integral terminal, horizontal members uniformly spaced and extending through said frame, vertical members uniformly spaced and extending through said frame, diagonal members extending obliquely across said frame from one face to the other, and other diagonal members extending obliquely across the frame from one face to the other in a direction opposite to the first-mentioned diagonal members, all members of the grid being cast integral with each other at their points of intersection and integral with the rectangular frame where they join the same.

5. A grid for a secondary battery, consisting of a rectangular frame having a terminal, vertical members extending through said frame, horizontal members extending through the frame and disposed adjacent to one face thereof, companion horizontal members extending through the frame and disposed at the opposite face thereof from the first horizontal members, diagonal members extending obliquely across said frame from one face to the other, and other diagonal members extending obliquely across the frame from one face to the other in a direction opposite to the first-mentioned diagonal members, all members of the grid being cast integral with each other at their points of intersection and integral with the rectangular frame where they join the same.

CLARENCE H. CABLE.

Witnesses:
JOSEPH PALLUCH.
WM. L. HOWES.

ELMER W. JONES.

Witnesses:
ALEXANDER D. SAPER,
JAMES FAIRWEATHER.